No. 616,391. Patented Dec. 20, 1898.
V. DE BARANOFF & E. HILDT.
PROCESS OF OBTAINING SULFUR FROM SULFATES.
(Application filed June 22, 1896.)
(No Model.)
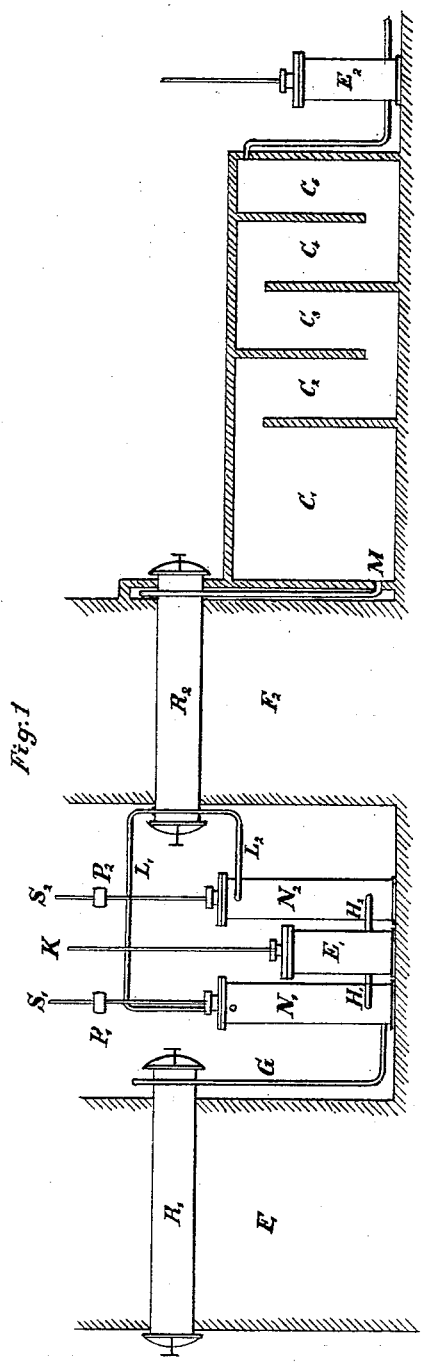
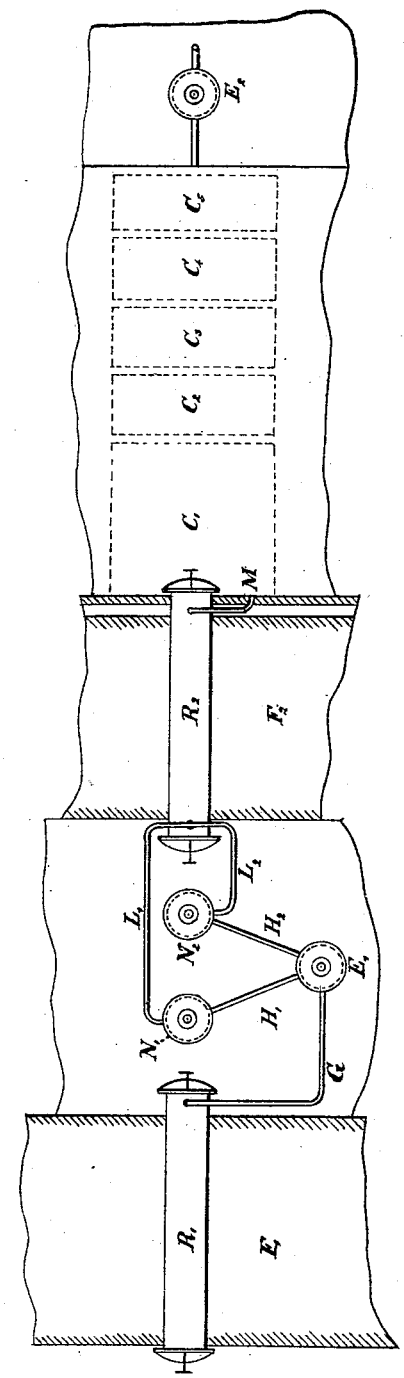

UNITED STATES PATENT OFFICE.

VLADIMIR DE BARANOFF AND EUGENE HILDT, OF PARIS, FRANCE.

PROCESS OF OBTAINING SULFUR FROM SULFATES.

SPECIFICATION forming part of Letters Patent No. 616,391, dated December 20, 1898.

Application filed June 22, 1896. Serial No. 596,524. (No specimens.)

*To all whom it may concern:*

Be it known that we, VLADIMIR DE BARANOFF, a subject of the Emperor of Russia, and EUGENE HILDT, a citizen of the French Republic, residing at Paris, France, have invented a new and useful improvement in the process of extracting simultaneously pure sulfur, sulfurous acid, and sulfids directly from sulfates; and we do hereby declare that the following is a full, clear, and exact description of the invention, which will enable others skilled in the art to which it appertains to use the same.

Heretofore pure sulfur, sulfurous acid, and such sulfids as those of sodium, of potassium, of calcium, of strontium, or of barium, employed in industrial arts or otherwise, have been obtained from quite different sources. The sulfur was extracted either from natural beds or from soda wastes and from pyrites. The sulfurous acid was produced either from pyrites or from pure sulfur. As to the sulfids, ($M_2S$,) they are manufactured up to this moment from sulfates, ($SO_4M_2$,) employing heat or any one of the following reducers for the sake of getting rid of their oxygen, ($O_4$:) carbon, (C,) hydrogen, (H,) their compounds, ($C_mH_n$,) called carburates, or, finally, oxid of carbon, (CO.) Among the sulfids those obtained from gypsum or the sulfate of lime ($CaSO_4$) are the most important of all, as the immense beds of this mineral permit to manufacture them in any amount whatever.

The peculiarity of our process consists principally in this, that we obtain the above-indicated results—*i. e.*, the simultaneous production of sulfur, sulfurous acid, and sulfids directly from sulfates—by utilizing the products derived from reducing a metallic sulfate by means of carbon, and, moreover, that we work at much lower temperature than it is presently done, economizing thereby the fuel very considerably.

For the sake of comprehensiveness and of a greater simplicity we will describe our process as applied to the treatment of sulfate of calcium, because it remains, without almost any modification, equally applicable to any other metallic sulfate; but as a matter of course this description must be considered as merely schematic as regards the disposition and the number of apparatuses used, for in order to bring out more prominently the principal parts of our process we are necessarily compelled to omit many details and to leave out everything that is not altogether new.

A closed chamber as a retort similar to those used in gasworks, which contains sulfate of calcium ($CaSO_4$) and a double equivalent of carbon (2C) in the shape of coke-dust, is heated to red, but not beyond that temperature, as otherwise, instead of carbonic acid ($CO_2$) we need for our process, there would be generated oxid of carbon, (CO,) which we have no use for, and whose presence, moreover, would be detrimental to our process. However, as the formation of oxid of carbon cannot be entirely prevented it will be found in the carbonic acid to the amount of ten per cent., but not more, if the red heat is not overreached. The result of this reduction may be expressed thus:

$$CaSO_4 + 2C = 2CO_2 + CaS.$$

An extracting-pump conveys this double quantity of carbonic acid while it is generated into two carbonizers, which contain, each of them, an equivalent of sulfid of calcium, (CaS.) Besides the sulfid of calcium there must be in each carbonizer an equivalent of water—*i. e.*, the sulfid must be mixed with water—and the carbonizer provided with an agitator. However, instead of mixing the sulfid with water steam may be used, and the carbonizers have perforated shelves inside of them on which the sulfid is spread in thin layers. In this case the agitator or mixer as a matter of course must be left out. The carbonic acid acting on the sulfid of calcium in presence of water will generate sulfureted hydrogen ($H_2S$) and the carbonate of calcium ($CaCO_3$) thus:

$$CaS + CO_2 + H_2O = H_2S + CaCO_3.$$

This formula represents the reaction which takes place in each carbonizer.

Now this double quantity of sulfureted hydrogen ($2H_2S$) is caused to act on sulfate of calcium ($CaSO_4$) contained in another retort without admixture of carbon, but simply heated to red. The result of it is expressed thus:

$$CaSO_4 + 2H_2S = 2H_2O + S + SO_2 + CaS.$$

That is to say, two equivalents of sulfureted hydrogen have decomposed one equivalent of sulfate of calcium into two equivalents of water, one of sulfur, one of sulfurous acid, and one of sulfid of calcium simultaneously and directly from the metallic sulfate. After having separated these last three products, whose extraction constitutes the principal object of our invention, we empty both retorts and transfer this sulfid of calcium into our two carbonizers. Then we charge anew the retorts with a fresh quantity of sulfate of calcium as at the beginning and may continue the operation as long as we want.

In the accompanying drawings, in which similar letters of reference indicate like parts, Figure 1 is a longitudinal elevation with a portion of the brickwork shown in section, and Fig. 2 is a plan of the same apparatus under like conditions.

On Fig. 1, R' is the retort filled up with sulfate of calcium and with a double equivalent of carbon in the shape of coke-dust. $R^2$ is the retort containing but sulfate of calcium without any admixture of carbon. N' and $N^2$ are the carbonizers filled with sulfid of calcium diluted with water and each of them provided with an agitator whose shafts S' and $S^2$ have each a pulley P' $P^2$, by means of which a rotating motion is communicated to the agitators. A sufficient number of spokes or arms are fixed to that part of the shafts which turns inside of the carbonizers. A pump E' with a piston-rod K sucks the carbonic acid out of the retort R' along the pipe G and forces it into carbonizers through the pipes H' and $H^2$. By two other pipes, L' and $L^2$, the sulfureted hydrogen which is generated in the carbonizers is carried to the retort $R^2$. A pipe M conveys the products of this reaction, which takes place in that second retort $R^2$, to the condensers, consisting of several chambers C' $C^2$ $C^3$ $C^4$ $C^5$, and the sulfur condenses itself in the first chamber C', while in the remaining chambers the vapor of water becomes liquid. On the outside of these chambers is a pump $E^2$, which exhausts the sulfurous acid and throws it into an apparatus where sulfuric acid is prepared. The furnaces under the retorts R' and $R^2$ are merely marked by letters F' and $F^2$, but not drawn in full, as their kind depends upon circumstances. The above-described process, though, undergoes a following modification in case it is desired to confine the production to the sulfurous acid and to sulfids, omitting as far as possible sulfur. In this case instead of using two carbonizers and of letting pass through each of them half of the carbonic acid generated in the first retort we work with one carbonizer and carry the second half of the carbonic acid to the sulfureted hydrogen obtained with the aid of the first half of carbonic acid, as before. In this way, according to Kohler, we will get $$CO_2 + H_2S = COS + H_2O.$$

The sulfureted oxid of carbon thus obtained is let to act on sulfate of calcium, and the formula gives $$3CaSO_4 + 4COS = 3CaS + 4CO_2 + 4SO_2.$$

It shows that we need three retorts with sulfate of calcium without carbon to every one retort with sulfate of calcium mixed with carbon.

It seems superfluous to add that we turn sulfurous acid into sulfuric acid when we see fit, and that, speaking generally, we let our products undergo a chemical transformation according to the requirements of the market and other circumstances; but as in all such subsequent treatments of our products we do not introduce any new method and simply use the well-known reactions we deem useless to describe them and merely claim the right to modify them chemically in the best way for our advantage without confining the production to the simultaneous extraction of the drugs stated in the preamble.

Having described one of the most important applications of our process of extracting simultaneously sulfur, sulfurous acid, and sulfids directly from sulfates of calcium, it remains only to supplement the description by indicating that our process can be easily and advantageously extended to the manufacture of other sulfids besides those of calcium. In fact, nothing prevents that a certain quantity of the sulfate of calcium we have been using above—namely, a quarter of it—should be replaced by some other sulfate—as, for instance, by sulfate of sodium, of potassium, of calcium, of barium, or of strontium—if there is an intention of manufacturing either its sulfids and carbonates or a mixture of sulfates with sulfates and carbonates of calcium. This possibility of substituting for the sulfate of calcium some other sulfate is of great value for the manufacturing of soda. The first two principal phases in its manufacture, according to the process of Leblanc, as it is well known, are namely these: First. One equivalent of sodium sulfate is reduced by two equivalents of carbon into sulfid of sodium with two equivalents of carbonic acid:

$$Na_2SO_4 + 2C = Na_2S + 2CO.$$

Second. The sulfid of sodium is treated at high temperature with carbonate of calcium, which gives sodium carbonate and sulfid of calcium, constituting what is generally known as "soda wastes," and from which by another process sulfur is extracted:

$$Na_2S + CaCO_3 = Na_2CO_3 + CaS.$$

Now, in the first place, having at our command plenty of sulfureted hydrogen coming from our carbonizers filled with sulfid of calcium and decomposed by carbonic acid we work with sulfate of sodium and get sulfid of sodium, sulfur, sulfurous acid, and two equivalents of water:

$$Na_2SO_4 + 2H_2S = Na_2S + S + SO_2 + 2H_2O.$$

Our second step is to submit this sulfid of sodium in presence of water to the action of carbonic acid, of which we have as much as we want from our first retort, and the result of this reaction is carbonate of sodium plus sulfureted hydrogen:

$$Na_2S + CO_2 + H_2O = Na_2CO_3 + H_2S.$$

Our process enables us to manufacture very economically sulfids of barium and of strontium.

By incorporating into a sulfate of calcium a suitable quantity of certain metallic salts—as, for instance, those of zinc, of bismuth, &c.—we obtain a sulfid of calcium of a highly-phosphorescent quality, which can be used for the same purposes as any other phosphorescent body.

We claim as our invention—

1. The herein-described process of extracting sulfur simultaneously with sulfids and sulfurous acid from metallic sulfates by treating a metallic sulfate with sulfureted hydrogen under heat and thereby decomposing the sulfate into sulfur, sulfurous acid and sulfids, substantially as described.

2. The herein-described process of extracting sulfur, simultaneously with sulfids and sulfurous acid from metallic sulfates by reducing a metallic sulfate by means of carbon under heat, causing the carbonic acid generated to act in presence of water upon a metallic sulfid to generate sulfureted hydrogen and then treating a metallic sulfate with the sulfureted hydrogen under heat and thereby decomposing the sulfate into sulfur, sulfurous acid and sulfids, substantially as described.

VLADIMIR DE BARANOFF.
E. HILDT.

Attest:
CLYDE SHROPSHIRE,
EDWARD L. STAREK.